United States Patent
Mathews, Jr. et al.

(10) Patent No.: US 12,311,913 B2
(45) Date of Patent: May 27, 2025

(54) SYSTEM AND METHOD FOR MANAGING VEHICLE OPERATIONS

(71) Applicant: Transportation IP Holdings, LLC, Norwalk, CT (US)

(72) Inventors: Harry Kirk Mathews, Jr., Clifton Park, NY (US); James D. Brooks, Grove City, PA (US); Ajith Kuttannair Kumar, Erie, PA (US); Gayathri Seenumani, Niskayuna, NY (US); Sharath Sridhar Aramanekoppa, Bangalore (IN)

(73) Assignee: Transportation IP Holdings, LLC, Norwalk, CT (US)

( * ) Notice: Subject to any disclaimer, the term of this patent is extended or adjusted under 35 U.S.C. 154(b) by 189 days.

(21) Appl. No.: 17/453,087

(22) Filed: Nov. 1, 2021

(65) Prior Publication Data

US 2022/0242391 A1    Aug. 4, 2022

Related U.S. Application Data

(60) Provisional application No. 63/143,116, filed on Jan. 29, 2021.

(51) Int. Cl.
*B60W 20/12* (2016.01)
*B60W 20/16* (2016.01)
(Continued)

(52) U.S. Cl.
CPC ............ *B60W 20/12* (2016.01); *B60W 20/16* (2016.01); *B60W 30/18127* (2013.01);
(Continued)

(58) Field of Classification Search
CPC ................. B60W 20/12; B60W 20/16; B60W 30/18127; B60W 2510/244;
(Continued)

(56) References Cited

U.S. PATENT DOCUMENTS 10,829,104 B2    11/2020  Lavertu
2005/0228553 A1*  10/2005  Tryon ................... B60L 50/16
                                          701/22
(Continued)

OTHER PUBLICATIONS

Merriam Webster, "function," 2009. (Year: 2009).*
First Examination Report for related Indian Patent Application No. 202114061759 dated Aug. 23, 2022 (7 pages).

*Primary Examiner* — Aniss Chad
*Assistant Examiner* — Stephanie T Su
(74) *Attorney, Agent, or Firm* — K&L Gates LLP (57) ABSTRACT

A method and system controller includes determining a power requirement for a vehicle system to complete a planned trip over a route. The method includes determining whether an amount of available power from the vehicle system is sufficient to propel the vehicle system to complete the planned trip by comparing the available power with the power requirement that is determined. The method includes changing one or more operational aspects of the planned trip based on the comparison between the amount of available power and the power requirement that is determined to generate a newly planned modified trip.

22 Claims, 4 Drawing Sheets (51) Int. Cl.
*B60W 30/18* (2012.01)
*G01C 21/34* (2006.01)

(52) U.S. Cl.
CPC ..... *G01C 21/3469* (2013.01); *G01C 21/3476* (2013.01); *B60L 2200/26* (2013.01); *B60W 2510/244* (2013.01); *B60W 2510/248* (2013.01); *B60W 2510/28* (2013.01); *B60W 2530/10* (2013.01); *B60W 2552/15* (2020.02); *B60W 2552/30* (2020.02); *B60W 2555/20* (2020.02); *B60Y 2200/92* (2013.01)

(58) Field of Classification Search
CPC ....... B60W 2510/248; B60W 2510/28; B60W 2530/10; B60W 2552/15; B60W 2552/30; B60W 2555/20; B60W 20/14; B60W 2556/45; B60W 50/00; G01C 21/3469; G01C 21/3476; B60L 2200/26; B60Y 2200/92; B60K 6/22; B62D 53/00
See application file for complete search history.

(56) References Cited

U.S. PATENT DOCUMENTS

| | | | |
|---|---|---|---|
| 2012/0316717 A1* | 12/2012 | Daum | B60L 55/00 |
| | | | 701/22 |
| 2014/0136025 A1* | 5/2014 | Cooper | B61L 27/12 |
| | | | 701/2 |
| 2015/0232097 A1 | 8/2015 | Luther et al. | |
| 2015/0275787 A1* | 10/2015 | Dufford | B60W 30/188 |
| | | | 701/112 |
| 2016/0138925 A1* | 5/2016 | Takahashi | B60L 53/665 |
| | | | 701/533 |
| 2018/0186357 A1* | 7/2018 | Deshpande | B60W 30/188 |
| 2019/0248359 A1* | 8/2019 | Miller | B60W 50/0097 |
| 2019/0256078 A1* | 8/2019 | Lavertu | B60W 10/08 |
| 2019/0318553 A1* | 10/2019 | Pati | G01C 21/3469 |
| 2020/0122588 A1* | 4/2020 | Cserna | B60L 58/12 |
| 2020/0207218 A1 | 7/2020 | Lavertu et al. | |

* cited by examiner

SYSTEM AND METHOD FOR MANAGING VEHICLE OPERATIONS

CROSS-REFERENCE TO RELATED APPLICATIONS

This application relates to and claims priority benefits from U.S. Provisional Application No. 63/143,116, entitled "System and Method for Managing Vehicle Operations," filed Jan. 29, 2021, which is hereby incorporated by reference in its entirety.

BACKGROUND

Technical Field

The subject matter herein describes embodiments relating to vehicle control operations.

Discussion of Art

Prior to using a vehicle system to transport cargo from a pickup location to a drop-off location, a trip is planned for the vehicle system to accomplish the task. The trip refers to and includes assigned constraints, such as the pickup and drop-off locations, and a scheduled arrival time at the drop-off location. The trip may refer to and include characteristics about the cargo, the vehicle system, and one or more routes to be taken by the vehicle system between the pickup and drop-off locations. For each trip, if the vehicle system does not have at least a certain amount of available energy onboard for propulsion and at least a certain instantaneous power at a given time that is available for propulsion and auxiliary loads (like lights, HVAC, compressed air etc.), the vehicle system will not be able to complete the scheduled trip as planned. For example, the vehicle system may not be able to reach the drop-off location at all due to running out of fuel or draining stored energy, or the vehicle system may still be able to complete the trip but not according to the assigned constraints (e.g., the arrival may be delayed beyond the scheduled arrival time). Furthermore, even if the vehicle system initially has sufficient available energy and instantaneous power onboard to complete the trip as planned, various events may occur during the trip that significantly reduce the available energy and/or instantaneous power. For example, one or more components associated with propulsion may fail on the vehicle system during the trip, which reduces the power output capability of the vehicle system. In another example, a delay caused by an external event, such as a vehicle accident, stranded vehicle, route damage, unscheduled slowing or stopping due to signals/traffic, drag changes (example due to wind, snow, rain), or the like, can cause the vehicle system to idle for an extended period of time, which reduces the energy supply onboard the vehicle system so less energy is available for propulsion.

When trip planning, the decision of how to power the vehicle system is an imprecise and rudimentary task. In an effort to ensure that sufficient energy and power is available to complete a trip as planned, the vehicle system may be conservatively assembled with significantly more energy and power availability than necessary to complete the planned trip. In the context of railroading, four or more diesel-powered locomotives may be assembled in a group or consist to propel a train. Adding more fuel and/or propulsion-generating components to the vehicle system than necessary, such as one or more entire locomotives, may reduce the efficiency of the trip due to added weight, and may increase emissions, fuel consumption, and noise. Therefore, it may be desirable to have a system and method that differs from those that are currently available.

BRIEF DESCRIPTION

In one or more embodiments, a method for managing vehicle operations includes determining a power requirement for a vehicle system to complete a planned trip over a route. The method includes determining whether an amount of available power from the vehicle system is sufficient to propel the vehicle system to complete the planned trip by comparing the available power with the power requirement that is determined. The method also includes changing one or more operational aspects of the planned trip based on the comparison between the amount of available power and the power requirement that is determined to generate a newly planned modified trip.

In one or more embodiments, a controller includes one or more processors. The one or more processors are configured to determine a power requirement for a vehicle system to complete a planned trip, and determine whether an amount of available power from the vehicle system is sufficient to propel the vehicle system to complete the planned trip by comparing over time the amount of available power with the power requirement that is determined. The one or more processors are configured to change the planned trip based at least in part on the comparison between the amount of available power and the power requirement that is determined.

In one or more embodiments, a method for managing vehicle operations includes determining a power requirement for a vehicle system to complete a planned trip over a route. The method includes determining whether an amount of available power from the vehicle system is sufficient to propel the vehicle system to complete the planned trip by comparing the available power with the power requirement that is determined. The method also includes changing one or more operational aspects of the planned trip based on the comparison between the amount of available power and the power requirement that is determined to generate a newly planned modified trip. Changing the one or more operational aspects includes one or more of replacing a fuel-consuming vehicle of the vehicle system with a battery-powered vehicle or changing one or more operational aspects of the battery-powered vehicle included in the vehicle system.

BRIEF DESCRIPTION OF THE DRAWINGS

The inventive subject matter may be understood from reading the following description of non-limiting embodiments, with reference to the attached drawings, wherein below.

DETAILED DESCRIPTION

Embodiments described herein are directed to a system and method for managing a vehicle system. This may entail changing a previously planned trip for a vehicle system based at least in part on a power and energy budget analysis for the vehicle system to complete the previously planned trip. The analysis may include determining a power requirement as a function of time for the vehicle system to complete the previously planned trip according to designated constraints. The designated constraints may include designated start and end locations, a scheduled arrival time, a designated period of time to complete the trip, movement restrictions (e.g., speed limits), route restrictions, constraints due to load (e.g., force/impact constraints on the couplers of the load), and/or the like. The power requirement refers to power output to propel a vehicle system along one or more routes during the planned trip. The determination of the power requirement may include determining an amount of energy required for the vehicle system to complete the planned trip, based on the relationship between energy, power, and time. The analysis also may include determining an amount of available power that the vehicle system can provide for powering propulsion and necessary auxiliary loads as a function of time during the planned trip, as well as available energy for propulsion and necessary auxiliary loads onboard the vehicle system. The amount of available power may be then compared to the power requirement over time, and differences between the two properties are used by one or more processors to change the previously planned trip.

The analysis may be predictive because the available power over time may be determined prior to the vehicle system traveling along the planned trip. For example, the available power over time models the power and energy capability of a given propulsive unit or consist of a vehicle system traveling on a route prior to the vehicle system actually traveling on the route. The analysis may be performed during a trip planning process, such as by one or more processors at a dispatch facility.

By comparing how the power requirement of a vehicle system to complete a planned trip differs from the available power of the vehicle system over time, the system and method described herein can modify aspects of the planned trip to satisfy or enhance certain objectives, such as increasing energy efficiency, increasing fuel economy, completing the trip at a scheduled arrival time, reducing the number of fuel-consuming engines and/or vehicles present in the vehicle system, and/or the like.

In one embodiment, based on the analysis, the one or more processors may change the vehicle makeup of the vehicle system to substitute at least one battery-powered vehicle in place of one or more fuel-consuming vehicles, which can reduce fuel consumption, emissions, and noise, and increase efficiency. In another non-limiting example, if the analysis indicates a shortfall in the amount of available power at given time period relative to the power requirement during that period to complete the trip as planned, the one or more processors may change the trip to remedy the shortfall. The shortfall may be remedied by taking measures to increase the available power and/or reduce the power requirement during the given time period. For example, the available power can be increased by redistributing power outputs of different power sources of the vehicle system during the trip, capturing regenerative energy during braking, connecting to an offboard power source, and/or changing the vehicular makeup. The power requirement during the given time period can be reduced by, for example, changing the planned trip to include one or more routes with a smaller incline grade and/or larger radii of curvature, delaying the scheduled time of arrival, and/or extending the designated period of time at which to complete the trip. Suitable offboard power sources, such as catenary lines or third rails, may both propel the vehicle (reducing the load on the on-board energy storage system) and recharge the on-board energy system (such as batteries) while the vehicle system continues traversing the route to complete the trip.

The detailed power and energy budget analysis enables planning trips and controlling vehicle systems along trips with enhanced linking or matching between the power and energy required to complete the trips and the power and energy available on the vehicle systems to complete the trips. Such information enables precise tailoring of the vehicle system (and the movement of the vehicle system) to the specific planned trip, which avoids the efficiency cost of saddling the vehicle system with excessive amounts of fuel and/or propulsion-generating components, while maintaining confidence that the vehicle system can complete the trip as planned.

Figure 1:
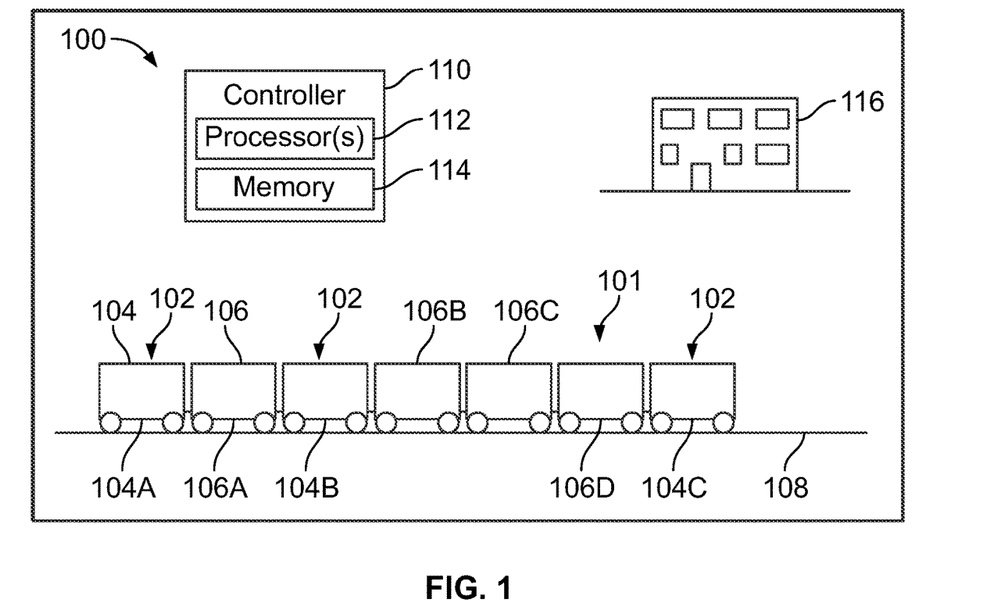
FIG. 1 illustrates a control system for managing a vehicle system, and controlling movement of the vehicle system on a planned trip according to an embodiment.

FIG. 1 illustrates a control system 100 for changing a planned trip and controlling movement of a vehicle system 101 on the planned trip according to an embodiment. The control system may include a controller 110 (e.g., a control device) which performs at least some of the operations described herein to change a previously planned trip. The controller represents hardware circuitry that may include and/or may be connected with one or more processors 112 (e.g., one or more microprocessors, integrated circuits, microcontrollers, field programmable gate arrays, etc.). The controller may include and/or may be connected with a tangible and non-transitory computer-readable storage medium (e.g., memory) 114. For example, the memory may store programmed instructions (e.g., software) that may be executed by the one or more processors to perform the operations of the controller described herein. The memory additionally or alternatively may store different information, such as a log or record of sensor data generated by one or more sensors, a route database that may include a map of one or more routes optionally with grade and curvature information and movement constraints (e.g., speed, noise, and/or emissions limits), a vehicle database that stores information related to the types or categories of vehicles and propulsion-generating components and equipment onboard the vehicle system, and a trip database that may include a schedule of one or more trips of the vehicle system.

Depending at least in part on the end use requirements, the controller can be disposed onboard or offboard the vehicle system in various embodiments. In one embodiment, the controller may be entirely disposed onboard the vehicle system. In other embodiments, the controller may be entirely disposed at a location that may be offboard the vehicle system, such as at a dispatch facility 116, at a wayside device, on a mobile computing device (e.g., a smartphone or laptop), or the like. In yet another embodiment, a first portion of the controller can be located onboard the vehicle system, and a second portion of the controller can be located offboard the vehicle system, such as at the dispatch facility. The two portions may wirelessly communicate with each other using circuitry and antennas for signal transmission and reception.

The vehicle system may include several vehicles 104, 106 that travel on a route 108. The vehicles 104 (e.g., the vehicles 104A-C) represent propulsion-generating vehicles that generate tractive effort or power to in order to propel the vehicle system along the route. The vehicles 106 (e.g., the vehicles 106A-D) represent non-propulsion generating vehicles that do not generate tractive effort or power. Some of the non-propulsion-generating vehicles may be disposed between propulsion-generating vehicles. The propulsion-generating vehicles also include propulsion systems. The non-propulsion-generating vehicles include brake systems but lack propulsion systems, such that the propulsion-generating vehicles propel the non-propulsion-generating vehicles along the route. The illustrated number and arrangement of the vehicles in the vehicle system are provided as one non-limiting example permutation of the vehicle system. The vehicle system may have as few as one propulsion-generating vehicle and as few as zero non-propulsion-generating vehicles. The vehicle system also may include more vehicles than shown in FIG. 1.

The vehicles in FIG. 1 are mechanically interconnected in a single-file line and travel together on the route. The vehicles may be connected via couplers. Although the vehicles in the vehicle system are mechanically coupled with each other in FIG. 1, in an alternative embodiment at least some of the vehicles are mechanically separate from each other (e.g., not mechanically coupled). For example, the vehicles that are mechanically separate may be logically (e.g., communicatively) connected by wireless communication links to coordinate vehicle movements with each other to enable the vehicles of the vehicle system to travel together along the route without being mechanically coupled to each other.

In one embodiment, the vehicle system may be a rail-based train, and the route may be a railroad track, with the propulsion-generating vehicles being locomotives. The three locomotives shown in FIG. 1 may represent a consist 102. The non-propulsion-generating vehicles can be rail cars that carry cargo and/or passengers. In another non-limiting embodiment, the vehicle system may be a platoon of over-the-road vehicles and the route is a road or path. For example, the propulsion-generating vehicles may be trucks (e.g., highway semi-trucks, mining trucks, logging trucks, or the like), and the non-propulsion-generating vehicles may be trailers coupled to the trucks. In yet other embodiments, the vehicle system may be other types of vehicles, such as automobiles, marine vessels, aerial vehicles, and the like. Various terms can interchangeably describe the vehicle systems, such as swarms, platoons, consists, groups, fleets and the like. The common feature is that at least one of the vehicles in the vehicle system is controlled according to an embodiment of the invention. The rest of the vehicles may be controlled directly or may simply follow the lead of another vehicle in the group of vehicles.

In an embodiment, the consist of the vehicle system is a hybrid consist that may include more than one type of vehicle and/or a vehicle that has more than one source for powering propulsion and necessary auxiliary loads of the vehicle system on the route. Suitable power sources may include or represent a fuel-combustion engine, one or more fuel cells, one or more electrical storage devices, or the like. The electrical storage devices may include or represent battery cells, capacitors (e.g., ultra-capacitors), and/or the like. For example, at least one of the propulsion-generating vehicles 104 may have a first power source, and at least another of the propulsion-generating vehicles may have a second power source that is a different type or category than the first power source. The first power source could be an internal combustion engine. The second power source could be a battery pack that may include a plurality of battery cells. In another example, a single propulsion-generating vehicle can be a hybrid vehicle that has both a first power source and a different, second power source that both can contribute to propulsion of the vehicle system. Propulsion-generating vehicles that include and rely exclusively on fuel-combustion engines or fuel cells to power propulsion and necessary auxiliary loads are referred to herein as fuel-consuming vehicles. Propulsion-generating vehicles that include and utilize electrical energy from onboard electrical storage devices to power propulsion and necessary auxiliary loads are referred to as battery-powered vehicles. Optionally, a battery-powered vehicle may be a hybrid vehicle that also may include fuel cells, an engine, or the like. Suitable engines may include compression ignition and spark ignition engine types. Suitable fuels may be selected, along with the corresponding engine, and may include one or both of a liquid fuel and a gaseous fuel. Suitable gaseous fuels may include hydrogen, liquefied natural gas (LNG), propane, ammonia, and the like. Suitable liquid fuels may include one or more of diesel, gasoline, kerosene, di-methyl ether, alcohol and the like. Suitable diesel may include regular diesel, HDRD, bio-diesel and the like. Suitable alcohol may include one or more of methanol, ethanol, propanol, butanol, and other short-chain alcohols as well as combustible hydrocarbons.

Figure 2:
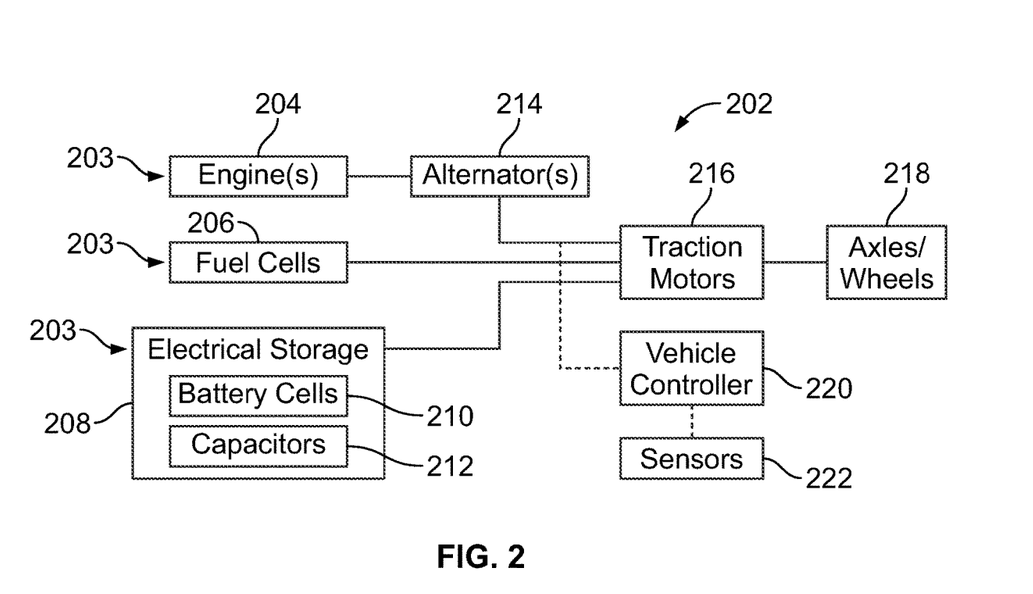
FIG. 2 is a schematic block diagram of components in a hybrid consist of a vehicle system according to an embodiment.

FIG. 2 is a schematic block diagram of components in a hybrid consist 202 of a vehicle system according to an embodiment. The hybrid consist 202 may represent the hybrid consist 102 of the vehicle system 101 shown in FIG. 1. The hybrid consist may include multiple different types of power sources 203 that can be used to power propulsion and necessary auxiliary loads of the vehicle system, including one or more engines 204, fuel cells 206, and electrical storage devices 208. Suitable electrical storage devices may include battery cells 210, capacitors 212, and/or the like. In one embodiment, the power source is located off-board the vehicle and supplies electric power through a power source device, such as wireless energy transfer device, a catenary line, and a third rail. The different power sources may be disposed on different propulsion-generating vehicles. The engine may be mechanically coupled to one or more alternators 214 that convert mechanical energy into electrical energy. The electrical energy supplied from a power source may be selectively directed to traction motors 216 onboard the consist. The traction motors are mechanically coupled via linkages to axles and wheels 218 of the consist and convert the electrical energy that is received from the power sources to mechanical energy that forces rotation of the axles and wheels 218 to propel the vehicle system. Other types of vehicles, such as marine vessels and aerial vehicles, may have propellers or other devices instead of axles and wheels.

The consist may include one or more vehicle controllers 220 that control the operation of the power sources and the flow of electrical energy between the power sources and the traction motors. For example, the vehicle controllers may control which type of power source supplies electrical energy to the traction motors during a given time period, as well as the characteristics (e.g., current and voltage) of the electrical energy supplied to the traction motors to provide a designated tractive effort. During braking of the vehicle system, the vehicle controllers can selectively control the traction motors to perform regenerative or dynamic braking. During regenerative braking, the traction motors generate electrical energy based on the rotation of the axles and wheels. At least some of the electrical energy that is generated can be directed to the electrical storage devices to recharge the electrical storage devices.

The vehicle controllers may be communicatively connected to sensors 222 that monitor operations of the propulsion components, such as the power sources. For example, a first set of one or more sensors may monitor a state of charge of the electrical storage devices. A second set of one or more sensors may monitor the amount of fuel present in a storage tank that is associated with the engine. A third set of one or more sensors may monitor the amount of fuel present in a storage tank associated with the fuel cells. Other sensors may monitor movement parameters of the vehicle system such as the speed of the vehicle system, ambient environmental conditions such as temperature and humidity, a current location of the vehicle system, and/or the like.

In an embodiment in which the controller of the control system shown in FIG. 1 is disposed off-board the vehicle system, the off-board controller may wirelessly query the vehicle controller for at least some of the sensor data generated by the sensors for use in planning and/or modifying a planned trip of the vehicle. For example, the vehicle controller can generate a status message for communication to the off-board controller via a communication device. The status message may include, for example, the current state of charge of the electrical storage devices and the current amount of fuel present in one or more onboard fuel storage containers. In an alternative embodiment in which the controller of the control system is disposed onboard the vehicle system, the controller may be integrated with the vehicle controller, or discrete from the vehicle controller but communicatively connected.

The controller shown in FIG. 1 may change a previously planned trip of the vehicle system by performing a budget analysis on the energy and power to be used for propelling the vehicle system to complete the previously planned trip. The previously planned trip is included in the definition of a planned trip. The budget analysis may include determining a power requirement as a function of time for the vehicle system to complete the planned trip. The budget analysis also determines whether an amount of available power as a function of time from the vehicle system is sufficient to propel the vehicle system to complete the previously planned trip. This sufficiency determination is performed by comparing, over time, the amount of available power with the power requirement that is determined. Based on the comparison, the planned trip is then changed. The one or more processors of the controller shown in FIG. 1 may be configured to perform the budget analysis and change the planned trip based on the budget analysis.

The comparison between the power required and the amount of available power may indicate an expected power or energy shortfall during one or more time periods during the trip such that the vehicle system is not able to meet the power requirement for completing the trip as planned. A shortfall may occur due to capability limitations of the hardware and equipment. For example, the power requirement may call for a power output of 15,000 horsepower (hp) at given time $t_1$ for propelling the vehicle system. A shortfall will occur if the cumulative available power output by the power sources onboard the hybrid consist of the vehicle system at time $t_1$ is limited to 14,000 hp. Another cause of shortfall is prematurely expending all available stored energy, such as running out of fuel and/or electrical charge, prior to completion of the planned trip. For example, the power requirement at a given time $t_2$ may call for a power output of 10,000 hp. Even if 10,000 hp is within the capability range of the hardware and equipment of the hybrid consist, the vehicle system may not be able to supply such power for propulsion at time $t_2$ if the vehicle system is predicted to have exhausted all available stored energy (e.g., fuel, electrical energy, and the like). In response to determining the shortfall, the planned trip is changed to remedy the shortfall such that the vehicle system, when traveling on the trip that was changed, does not experience the shortfall. The planned trip can be changed to remedy the shortfall by making changes to the vehicle system and/or the trip parameters to increase the amount of available power at the given times associated with the shortfall and/or reduce the power requirement at the given times.

In one or more embodiments, the budget analysis may be performed prior to the vehicle system embarking on the planned trip. The budget analysis may be performed during the planned trip of the vehicle system, such as in response to experiencing an event that was unexpected. For example, if the vehicle system experiences an unexpected delay during the trip, the power and energy budget analysis may be reperformed mid-trip to determine if the planned trip needs to be changed again based on the updated circumstances to ensure that the vehicle system has sufficient energy (e.g., power over time) and instantaneous power to complete the trip.

Figure 3:
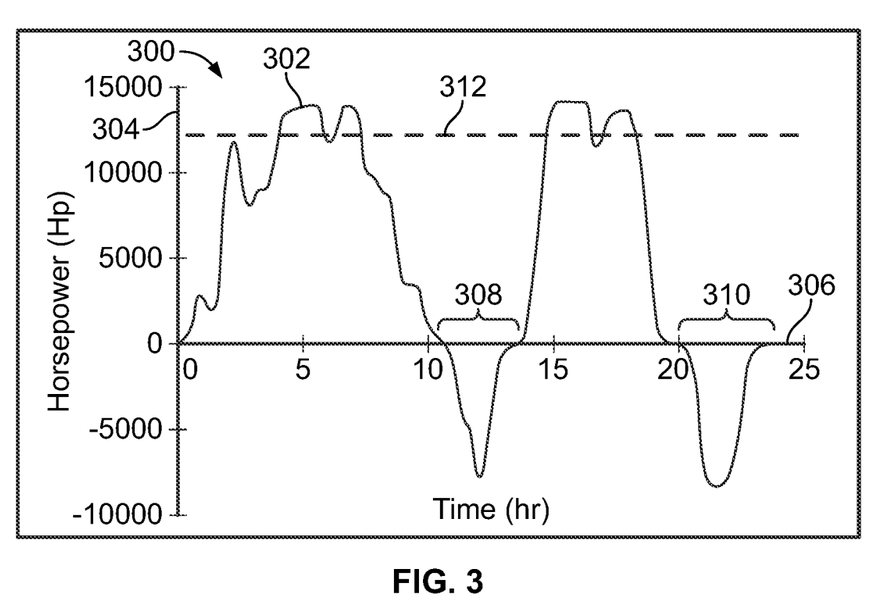
FIG. 3 is a graph plotting a power requirement as a function of time for a vehicle system to complete a previously planned trip according to an embodiment.

FIG. 3 is a graph 300 plotting a power requirement 302 as a function of time for a vehicle system to complete a previously planned trip according to an embodiment. The vertical axis 304 of the graph represents power, and the horizontal axis 306 represents time. The power is shown in horsepower (hp) and the time is shown in hours (hr), although other units of power and/or time can be used in other embodiments. The power requirement 302 may be determined by the one or more processors of the controller shown in FIG. 1. FIG. 3 is a simplified graph for the purposes of explanation and understanding, and an actual plot of power required over time for a planned trip may have more variations and data points. Although power requirement over time is plotted in FIG. 3, in other embodiments the power requirement may be represented as a function of distance along the route, as a function of location, as a function of vehicle mass or other vehicle parameter, and environmental conditions. Furthermore, the vertical axis could represent units of force, in another graph, required to power the vehicle system rather than of units of power.

The power requirement 302 as a function of time is determined based on various information about the planned trip. For example, the controller may collect trip information about the trip constraints and parameters, route information about the one or more routes on which the vehicle system will travel on the trip, movement constraints, vehicle and load information, and/or the like.

The trip information may include a starting location and an ending location, a scheduled departure time, a scheduled arrival time, a designated period of time in which to complete the trip after starting the trip, a distance to complete the planned trip along the one or more routes, and/or the like.

The trip constraints and other scheduled information may be stored in the memory of the controller and accessed by the one or more processors.

The route information can identify the specific routes to be taken by the vehicle system during the planned trip, such as the movement of the vehicle system from a first route to a second route and then to a third route. The routes may be streets, railroad tracks, paths, air lanes, marine channels, or the like. The route information may include geographic and/or geological information about the routes, such as a grade of the route, a radius of curvature of the route, currents, speed limits, traffic patterns, and the like. A greater amount of power is required to propel a vehicle system along an incline grade than to propel the vehicle system along a flat route. The route information may identify areas along the trip that could be associated with reduced airflow, such as tunnels, which could limit the efficiency of engines, if present in the vehicle system, requiring additional power consumption as compared to areas with greater access to fresh air flow. The route information may include ambient environmental conditions that could affect the trip, such as the ambient temperature along the trip, the ambient humidity along the trip, and any expected precipitation (rain or snow) that could affect wheel-route adhesion.

The movement constraints represent constraints on how the vehicle system can move during the trip due to imposed regulations, laws, and/or the like. The movement constraints can include speed limits, emissions limits, noise limits, and/or the like. Different segments of the trip can have different associated movement constraints. The movement constraints may refer to a speed profile that is planned to be followed by the vehicle system during the planned trip. The speed profile may designate different speed values as a function of time or location along the trip. Optionally, the speed profile may include tractive and braking settings to be implemented by the vehicle system based on time or location along the trip in order for the speed of the vehicle system over time to match the speed profile. Some portions of the speed profile may vary from designated speed limits along the routes due to various objectives and considerations, such as traveling to increase fuel efficiency and conserve fuel, reduce emissions, and/or reduce noise. The speed profile may be generated by the one or more processors of the controller and/or by other processing circuitry, such as an energy management system. The speed profile may be a trip plan.

The vehicle and load information can include general information about the vehicle system that is scheduled to take the planned trip and information about the cargo or load to be transported by the vehicle system on the planned trip. The information about the load can include a type, amount, and/or weight of the load or cargo to be transported. The information about the vehicle system can include a weight of the vehicle system and/or general vehicular makeup information that can be used to estimate a weight of the vehicle system, such as a number of non-propulsion-generating vehicles and a number of propulsion-generating vehicles present in the vehicle system. Other information such as the length of the vehicle system may be utilized. The vehicular information optionally may not be specifically directed to one permutation of the hybrid consist. For example, specific information about the hybrid consist, such as the category (or type) and number of each propulsion-generating vehicle, the specific power sources available to provide propulsion, and the specific conditions of the power sources (e.g., amount of fuel present, state of charge, etc.) may be used to determine the amount of available power as a function of time, which is compared to the power requirement.

For determining the power requirement as a function of time, it may be sufficient to estimate the total weight of the vehicle system, including weight attributable to the load or cargo, without requiring specific consist information. For example, the total weight of the vehicle system can be input into a physics-based model with the route information, the movement constraints, and the trip information to determine the power required over time for the vehicle system to complete the planned trip according to the constraints. The physics-based model may utilize physics equations of motion relating force, energy, power, and momentum to output the power requirement as a function of time based on the various input information described above. The power requirement represents the power output over time for propelling the vehicle system along the one or more routes on the scheduled day of the trip in order to arrive at the designated end location of the trip at the scheduled arrival time, without violating other constraints if possible, such as traveling below posted speed limits. Referring to FIG. 3, periods of increasing power can indicate that the vehicle system is accelerating, traveling up an incline grade, or the like. Periods of decreasing power can indicate that the vehicle system is decreasing speed (e.g., slowing), traveling along a decline grade, or the like. The power requirement in FIG. 3 indicates a maximum instantaneous power demand of about 14,000 hp, which occurs at periods about 5 hours, about 7 hours, about 15 hours, and about 17.5 hours into the trip. The power requirement is negative during a first period 308 from about 10.5 hours to about 14 hours and a second period 310 from about 20 hours to about 23.5 hours into the trip. The negative power requirement indicates periods in which the traction motors can be used for regenerative braking to capture energy from the movement of the vehicle system. For example, the vehicle system may be predicted to be slowing and/or traveling downhill during the first and second regenerative periods 308, 310.

The next step in the energy and power budget analysis is to determine whether an amount of available power as a function of time from the vehicle system is sufficient to propel the vehicle system to complete the previously planned trip. This sufficiency determination is made by calculating the amount of available power that can be provided by the vehicle system for propulsion (and necessary auxiliary loads) over time during the planned trip. Unlike the power requirement, the amount of available power takes into account specific details about the hybrid consist of the vehicle system, such as the types of power sources available, the number of each type of power source, and the condition of each power source.

In one non-limiting example, the hybrid consist may include three fuel-consuming vehicles and one battery-powered vehicle. Each of the three fuel-consuming vehicles may include an engine (e.g., a combustion engine), such as a diesel engine. The battery-powered vehicle may not include an engine, but instead may include one or more electrical storage devices that supply electrical energy to traction motors to provide tractive effort. The one or more processors of the controller shown in FIG. 1 uses information about the specific hybrid consist to determine the amount of available power as a function of time. For example, relevant information about the three fuel-consuming vehicles in the hybrid consist can include a power rating of each of the engines, such as the rated maximum power output of the engine, a rate at which the engine consumes fuel, a percentage of the energy from the engine that can be converted to tractive effort, and/or an amount of fuel onboard the vehicle for combustion in the engine.

Relevant information about the battery-powered vehicle can include a charge capacity of the electrical energy storage device (e.g., battery pack), a state of charge of the electrical energy storage device (e.g., the voltage in the storage device) as a function of time, and/or a state of health of the electrical energy storage device. The state of health refers to the age and/or condition of the electrical energy storage device. For example, battery cells degrade over time which reduces the capacity of the cells, the rate at which the cells can be charged and discharged, and/or the like. The state of charge decreases as the electrical energy storage device supplies electrical energy to power the traction motors, and increases when the electrical energy storage device receives electrical energy from the traction motors that was captured during regenerative braking.

During a trip, the total amount of available energy onboard the vehicle system generally decreases over time as energy is consumed in the work to propel the vehicle system. The determination of the available power over time may factor opportunities to increase energy onboard the vehicle system during the trip. One example is through regenerative braking, as the captured energy can be supplied to the electrical energy storage device on the battery-powered vehicle to recharge the energy storage device. Another example to add energy is by scheduling a stop to refuel the fuel storage tanks and/or recharge the electrical energy storage device. The controller may account for refueling and/or recharging opportunities during the power and energy budget analysis.

If one or more of the propulsion-generating vehicles in the hybrid consist include fuel cells, the controller can factor in the number of fuel cells onboard the vehicle system, the amount of fuel for the fuel cells onboard the vehicle system, the type and efficiency of the fuel cells, and/or the power output or rating of the fuel cells. If one or more of the vehicles in the group contains an engine that runs on a gaseous fuel that is stored as a liquid (e.g., hydrogen, liquified natural gas) the controller may factor in the regassification rate of the regassification unit.

Based on the information above related to the specific hybrid consist, the controller shown in FIG. 1 may determine the amount of available power that can be provided by the vehicle system for propulsion as a function of time. The amount of available power at a given time is an instantaneous power output. The amount of available power over an extended time period, such as the duration of the trip, represents an amount of available energy. For example, the area under the power over time curve in FIG. 3 represents energy.

In one or more embodiments, the controller may account for in-trip changes to the amount of energy required for the vehicle system to complete the planned trip. The amount change or changes may be in response to changes in payload at different points along the trip or other factors that affect the amount of energy required to complete the trip/task. While other embodiments may account for, as an example, an unscheduled extended idle period as may be caused by a traffic jam (naturally a full stop can shut off the engine, but a slowly moving group may require the continuous use of energy), the embodiment contemplated here accounts for changes in the load and/or weather. For example, if the payload gets heavier then more energy may be consumed. The payload may get heavier if, for example, there is a heavy rain and the retained water increases the weight, or if additional cargo is onboarded at a waypoint along the route.

Other factors may include the need to traverse snow or mud with the vehicle system, and a mechanical failure that increases friction or decreases the efficiency in which energy is converted to motion. Another factor may be a shift in the wind direction or speed, or current direction or speed. While wind direction and speed have an impact on land based vehicle systems' energy efficiency (often a profound effect) for aerial vehicles it may be the greatest affect. Similarly, for marine vessels the water current may be a factor to be accounted for by the controller. Another factor may be an amount of reserve fuel and/or stored electrical energy, which may decrease over time during the trip as energy is expended. For example, burning fuel gradually reduces the weight of the fuel onboard the vehicle system over time, such that the vehicle may get slightly lighter (in weight) during the trip.

In one or more embodiments, the controller may reserve a designated amount of available energy onboard the vehicle system for use by the vehicle system after completion of the planned trip. The reserved amount of available energy is saved for use after the trip, such as to propel the vehicle system along a second, subsequent trip, to propel the vehicle system in a yard, and/or to power non-propulsion loads after completion of the trip. The reserved amount may be designated as a certain amount or percentage of fuel, such as 10% of the fuel capacity in one or more onboard storage tanks, or a certain voltage or percentage of charge capacity stored in the electrical energy storage device. Because the reserved amount of available energy is saved for work performed after the trip is complete, the reserved amount is not considered as available energy for completion of the trip. As such, the reserved amount of available energy may be excluded from the amount of available power as a function of time that is determined. For example, if the current state of charge of the electrical energy storage device is 50% of the charge capacity and the reserved amount of available energy corresponds to 10% of the charge capacity, then only 40% of the charge capacity (e.g., 50% minus 10%) can contribute to the amount of available power as a function of time for completion of the planned trip. Similarly, if the fuel-consuming vehicles of the hybrid consist have in aggregate 15,000 gallons, and 4,000 gallons are needed to meet the reserve amount of available energy, then only 11,000 gallons (15,000 minus 4,000) can contribute to the amount of available power as a function of time for completion of the planned trip.

The controller shown in FIG. 1 may determine whether the amount of available power from the vehicle system is sufficient to propel the vehicle system to complete the previously planned trip. This may be done as a function of time by comparing, over time, the amount of available power with the power requirement that is determined. It may be done as a function of distance, rate of power consumption, or another model. As described above, the amount of available power can be limited by mechanical equipment capabilities, such as engine power ratings, and by energy shortages, such as running out of available fuel or charge.

According to the non-limiting example above in which the hybrid consist may include three vehicles with diesel engines that are mechanically coupled to one battery-powered vehicle, optionally the maximum or rated power output of each diesel engine at a given time is 4,000 hp. The aggregate amount of available power from the diesel engines at a given time, assuming sufficient fuel quantities, is 12,000 hp, which is indicated at line 312 in FIG. 3. As shown in the graph 300, the three diesel-powered vehicles are able to power the vehicle system according to the planned trip (e.g., are able to satisfy the power requirement) until the power requirement exceeds 12,000 hp at about hour 4. The battery-powered vehicle has sufficient charge to supplement the diesel-powered vehicles and meet the power requirement at hour 4.

Figure 4:
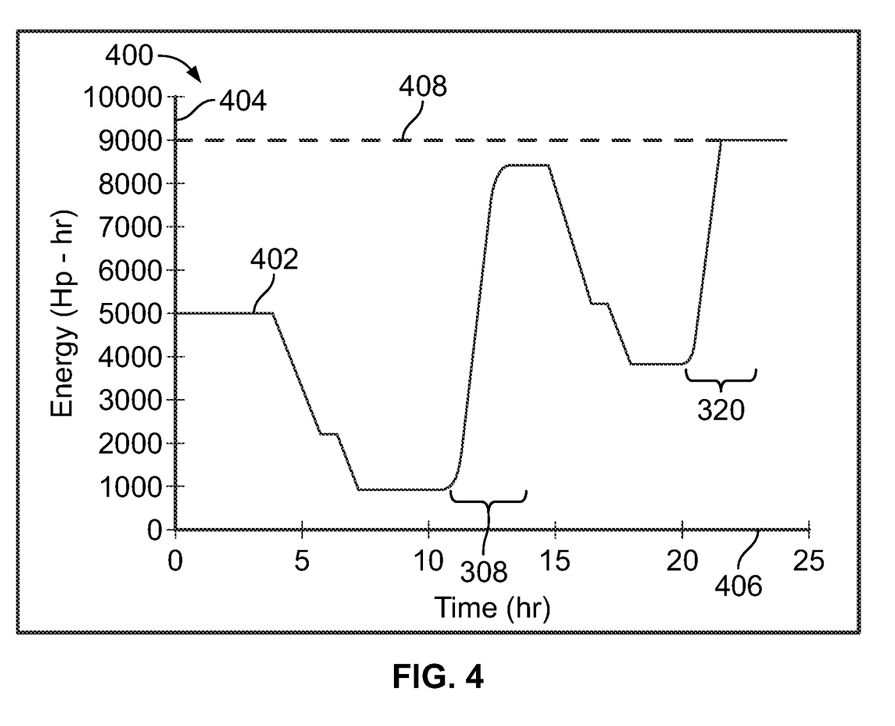
FIG. 4 is a graph plotting available energy stored in an electrical energy storage device of the vehicle system as a function of time during the previously planned trip of the vehicle system according to the embodiment in FIG. 3.

FIG. 4 is a graph 400 plotting available energy 402 stored in the electrical energy storage device of the vehicle system as a function of time during the planned trip of the vehicle system according to an embodiment. The vertical axis 404 of the graph represents energy in horsepower hours (hp·hr), and the horizontal axis 406 represents time in hours (hr), although other units of energy and/or time can be used in other embodiments. The capacity of the electrical energy storage device in the illustrated example is 9,000 hp·hr, as indicated by line 408. The available energy 402 represents a portion of the amount of available power as a function of time that is determined by the controller shown in FIG. 1. The power-over-time plotted in FIG. 3 and the energy-over-time plotted in FIG. 4 are both predictive, rather than reactive, such that the controller is predicting the amount of power and energy that will be required and available during a trip prior to the vehicle system actually traveling on the trip.

The graph in FIG. 4 indicates that the state of charge of the electrical energy storage device at the start of the trip (e.g., time 0) is 5,000 hp·hr. During the first four hours, the three diesel-powered vehicles may provide all of the power for propelling the vehicle system. At hour 4, there is a shortfall between the power requirement and the amount of available power from the diesel-powered vehicles, so electrical energy from the storage device is supplied to the traction motors to supplement the power supplied from the diesel engines. The state of charge (e.g., the amount of energy in the storage device) generally decreases over time until the electrical energy storage device is no longer used to provide power for propulsion or necessary auxiliary loads, which occurs at about hour 7. As shown in FIG. 4, the charge drops to about 1,000 hp·hr at hour 7 and remains constant for a period of time. At the first regenerative period 308, the controller estimates that regenerative braking will supply enough captured electrical energy to the electrical energy storage device to increase the state of charge from 1,000 hp·hr to about 8,500 hp·hr. The controller predicts that the power requirement to complete the planned trip again exceeds the aggregate amount of available power from the diesel engines (e.g., 12,000 hp·hr) at about 14.5 hours into the trip. As such, electrical energy is again drawn from the electrical energy storage device beginning at 14.5 hours to supplement the diesel engines. During this second power supply period, the state of charge dips to about 4,000 hp·hr. At about hour 20, the second regenerative period 320 starts, and the regenerative energy captured and supplied to the storage device charges the storage device to the charge capacity of 9,000 hp·hr. Once the electrical energy storage device reaches capacity, excess captured energy is supplied to other electrical energy storage devices or dissipated through resistive elements as heat.

As the example indicates in FIG. 4, the electrical energy storage device maintains at least 1,000 hp·hr throughout the duration of the trip, even when supplementing the diesel-powered engines. For example, there is never a shortfall in the power and energy budget because the electrical energy storage device is expected to always have enough energy available to supplement the diesel engines when needed to meet the power requirements. As a result, the hybrid consist that may include three fuel-consuming (e.g., diesel-powered) vehicles and one battery-powered vehicle is predicted to be able to complete the planned trip as scheduled. Configuring the vehicle system with three diesel-powered vehicles and one battery-powered vehicle (which lacks an engine) may complete the trip with greater energy efficiency, reduced fuel consumption, reduced emissions, and reduced noise relative to conventional dispatch methods which may conservatively assign at least four diesel-powered vehicles to propel the vehicle system on the planned trip without using any battery-powered vehicle. For example, the battery-powered vehicle may be more energy efficient, quieter, consume less fuel, and produce less emissions than the one or more diesel-powered vehicles that it replaces.

Figure 5:
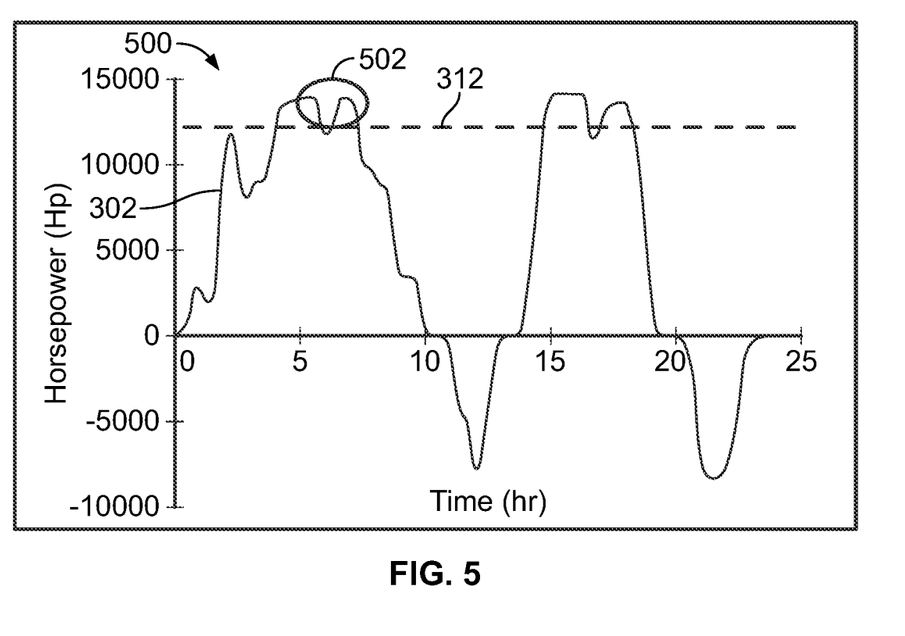
FIG. 5 is a graph plotting a power requirement as a function of time for a vehicle system to complete a previously planned trip according to another embodiment.
Figure 6:
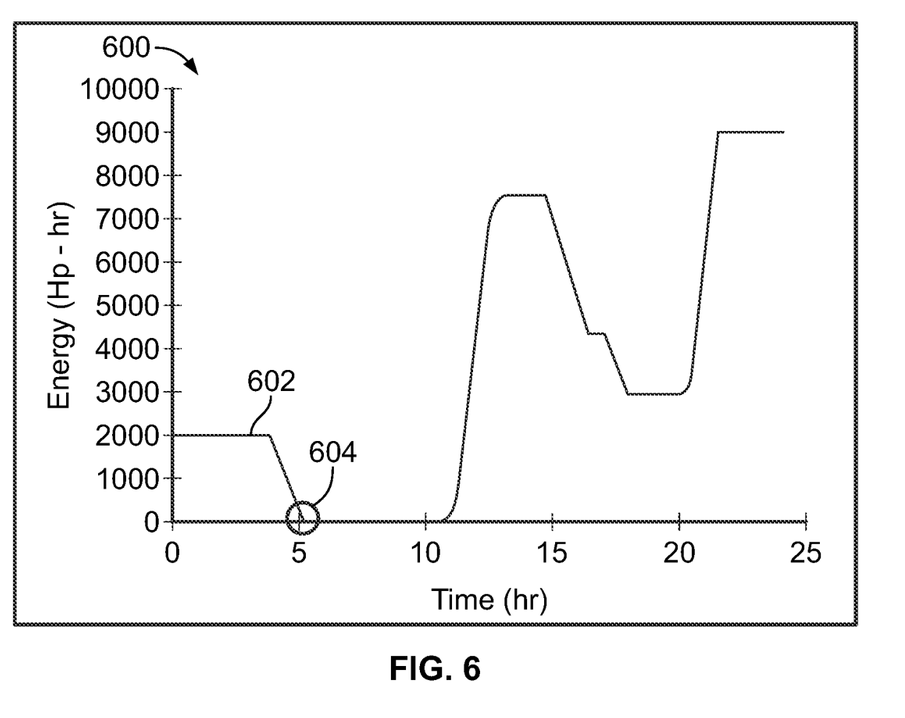
FIG. 6 is a graph plotting available energy stored in an electrical energy storage device of the vehicle system as a function of time during the previously planned trip of the vehicle system according to the embodiment in FIG. 5.

FIGS. 5 and 6 are used to illustrate a shortfall in which the amount of power available to propel the vehicle system as a function of time is insufficient to satisfy the power requirement that is determined. FIG. 5 plots a graph 500 of the power requirement 302 over time. The power requirement 302 in FIG. 5 is the same as shown in FIG. 3, so the same reference number is used. FIG. 6 plots a graph 600 of available energy 602 stored in the electrical energy storage device of the hybrid consist as a function of time during the planned trip of the vehicle system. In this shortfall example, the planned trip is the same as described above with reference to FIGS. 3 and 4. Optionally, the makeup of the hybrid consist of the vehicle system may also be the same as described above with reference to FIGS. 3 and 4. One difference, as indicated in FIG. 4, is that the initial state of charge of the electrical energy storage device is 2,000 hp·hr, instead of 5,000 hp·hr as shown in FIG. 4.

As shown in FIGS. 5 and 6, when the power requirement exceeds the aggregate power available from the diesel-powered engines at about hour 4, the electrical energy storage device supplies electrical energy to the traction motors. The current drain reduces the amount of available energy in the storage device all the way to 0 hp·hr at hour 5, which is indicated by marker 604. Once the storage device is fully depleted, the storage device cannot supply any additional electrical energy for powering propulsion or necessary auxiliary loads. The power requirement exceeds the aggregate capability 312 of the three diesel engines during most of the time period beyond hour 5 that is indicated by marker 502 in FIG. 5, but the electrical energy storage device cannot supplement the diesel engines. The difference between the power requirement 302 and the amount of available power 312 during the time period indicated by marker 502 represents a shortfall. The shortfall means that the hybrid consist of the vehicle system according to the specific permutation is not able to provide sufficient power to enable the vehicle system to complete the trip as planned.

The shortfall in the illustrated example is identified assuming that all vehicles and propulsion-related components of the vehicles operate as planned. The controller optionally may account for a risk of one or more components failing during the trip, which would decrease the amount of available power as a function of time. The failure may include a broken axle, a damaged engine, or the like. For example, the controller may apply a correction factor that reduces the available power that is determined by a certain amount or percentage to address the risk of component failure. The risk of failure may increase over time during the trip, such that the risk of failure is greater along an end segment of the trip than along a beginning segment.

According to one or more embodiments, the controller shown in FIG. 1 may change the planned trip based on the comparison, over time, between the power requirement and the amount of power available. For example, if there is a shortfall, such as the shortfall indicated at marker 502 in FIG. 5, the controller may change the planned trip to remedy (e.g., eliminate) the shortfall.

In one example, the controller may change the planned trip by directing a change in the vehicular makeup of the vehicle system. For example, the vehicular makeup may be changed to remedy the shortfall by adding at least one (additional) battery-powered vehicle to be included in the vehicle system. The at least one battery-powered vehicle may replace one or more fuel-consuming vehicles. The vehicular makeup could be changed by increasing the state of charge of an existing battery-powered vehicle in the consist, such as by increasing the initial state of charge from 2,000 hp·hr to 5,000 hp·hr. FIGS. 3 and 4 indicates that an initial state of charge equivalent to 5,000 hp·hr would be sufficient to remedy the shortfall indicated in FIG. 5. Another way to change the vehicular makeup could be to increase the charge capacity of the battery-powered vehicle, such as by increasing the number and/or size of battery cells.

In a second example, the controller may change the planned trip by changing operational aspects of the trip. The operational aspects refer to how the vehicle operates during the trip, such as movement parameters (e.g., speed, acceleration, deceleration), number and duration of stops, specific path of travel, and the like. The controller may change an operational aspect by modifying or relaxing scheduled trip parameters and/or constraints, such as speed limits, arrival times, and the like. Optionally, the controller may remedy the shortcoming by delaying a scheduled arrival time of the vehicle system on the planned trip, or otherwise provide additional time for the vehicle system to complete the trip. Delaying the scheduled arrival time and/or increasing the designated period of time at which to complete the trip will reduce the power requirement as a function of time because additional time is allowed to perform the same work. A corollary of delaying the arrive time is decreasing the speed of the vehicle system along the route, as the result of decreasing the speed will likely be a delayed arrival time.

The controller may change the planned trip by exceeding a movement constraint of the planned trip. For example, the controller may allow the vehicle system to exceed limitations on an amount of emissions generated by the vehicle system and/or an amount of noise produced by the vehicle system. Exceeding such limitations may increase the amount of available power that can be provided by the fuel-consuming vehicles, which can be used to meet the power requirement. Optionally, because the budget analysis can predict the time and/or location of the shortfall, the controller may allow the vehicle system to exceed the movement constraint only to the extent necessary to remedy the shortfall. For example, after hour 7 in FIG. 5, the controller may reinstate the movement constraints because there is no other anticipated shortfall.

Another trip parameter that could be changed is the one or more specific routes on which the vehicle system will travel on the planned trip. For example, the planned trip may include a first set of routes. The controller may change the planned trip to include a different, second set of routes, which may be sufficient to eliminate the shortfall. For example, the first set of routes may include a larger uphill grade and/or a shorter radius of curvature than the second set of routes, such that more power is required to traverse the first set of routes than the second set of routes, even if the second set of routes defines a longer distance to complete the planned trip than the first set of routes.

In a third example, the controller may change the planned trip by adding a stop to refuel and/or recharge the hybrid consist of the vehicle system. For example, if a stop is made to recharge the electrical energy storage device in the first four hours of the trip, then the electrical energy storage device could have sufficient energy to meet the excess power demand, eliminating the shortfall at marker 502 in FIG. 5.

In a fourth example, the controller may change the planned trip by changing the power distribution between the various power sources. For example, because the electrical energy storage device is relatively depleted at the start of the trip as shown in FIG. 6, the trip can be changed to use one or more of the diesel engines to power a generator, such as a traction motor, to charge the electrical energy storage device during the first hours of the trip. Then, when the stored electrical energy is needed at hour four, the state of charge would be sufficient to meet the excess power demand without reaching the depleted state. Optionally, the trip may be changed to control the at least one battery powered vehicle and the fuel-consuming vehicles to provide different amounts of tractive effort over time to propel the vehicle system based on a financial cost of different sources of the available power. For example, when multiple power sources are available to individually satisfy the power requirement during a given time period, the controller may select the power source to provide the propulsion during the given time period that represents the least financial cost per power output.

The controller optionally may change the planned trip to include multiple of the control operations described in the above examples. After changing the planned trip, but prior to the vehicle system starting the trip, the controller may reperform the power and energy budget analysis based on the updated planned trip to determine an updated difference between the power requirement and the amount of available power.

For example, the power requirement 302 shown in FIGS. 3 and 5 represents a first power requirement. If the controller changes the planned trip by delaying designated arrival time and/or extending the designated period of time to complete the trip, then the controller determines a modified power requirement as a function of time for the vehicle system to complete the previously planned trip based on the changed arrival time and/or the changed trip duration. Then, the controller determines whether the amount of available power from the vehicle system is sufficient to propel the vehicle system to complete the previously planned trip by comparing the amount of available power with the modified power requirement that is determined. If the changed to the planned trip do not affect the amount of available power, then the controller can use the same amount as previously calculated. On the other hand, if the capacity of the electrical energy storage device is increased, for example, then the controller may determine a modified amount of available power as a function of time. Based on the comparison between updated values of one or both of the power requirement and the amount of power available, the controller may confirm and save the planned trip as modified or may change the planned trip again. In this manner of incrementally changing the planned trip, the controller may focus or narrow towards a permutation of the planned trip (e.g., specific routes, vehicular makeup, etc.) that satisfies designated constraints, such as providing an acceptable arrival time, while being more energy efficient, consuming less hydrocarbon-based fuel, generating less emissions, and/or producing less noise than other vehicle trips that are not planned in this manner.

Once the planned trip is confirmed and saved (e.g., finalized), the vehicle system may travel according to the finalized planned trip at the scheduled departure or start time of the trip. For example, the vehicle system may be configured and assembled with the specific vehicular makeup designated in the finalized planned trip, and may travel along a specific set of routes according to a specific set of movement constraints outlined in the finalized planned trip. During movement of the vehicle system on the trip, certain events may occur that were unexpected during the planning stage, such as unanticipated delays, unanticipated amounts of damage or component failure, and the like. In an embodiment, the controller may reperform the power and energy budget analysis during the trip based on the present circumstances of the vehicle system for controlling the vehicle system along a subsequent segment of the trip.

During the trip, the controller may determine a second power requirement (e.g., the first power requirement was determined pre-trip) as a function of time for the vehicle system to complete a segment of the planned trip. The segment may be a remaining or upcoming segment of the trip. The second power requirement may be a remaining power requirement that refers to the amount of power required as a function of time to complete the remaining portion of the trip. The controller may also determine a second amount of available power as a function of time from the vehicle system (e.g., the first amount of available power was determined pre-trip). Then the controller can compare the second power requirement to the second amount of available power over time to determine whether the second amount of available power is insufficient to propel the vehicle system to complete the segment of the planned trip according to the second power requirement. Based on a detected shortfall or insufficiency, the controller can change the segment of the planned trip to remedy or eliminate the shortfall.

Figure 7:
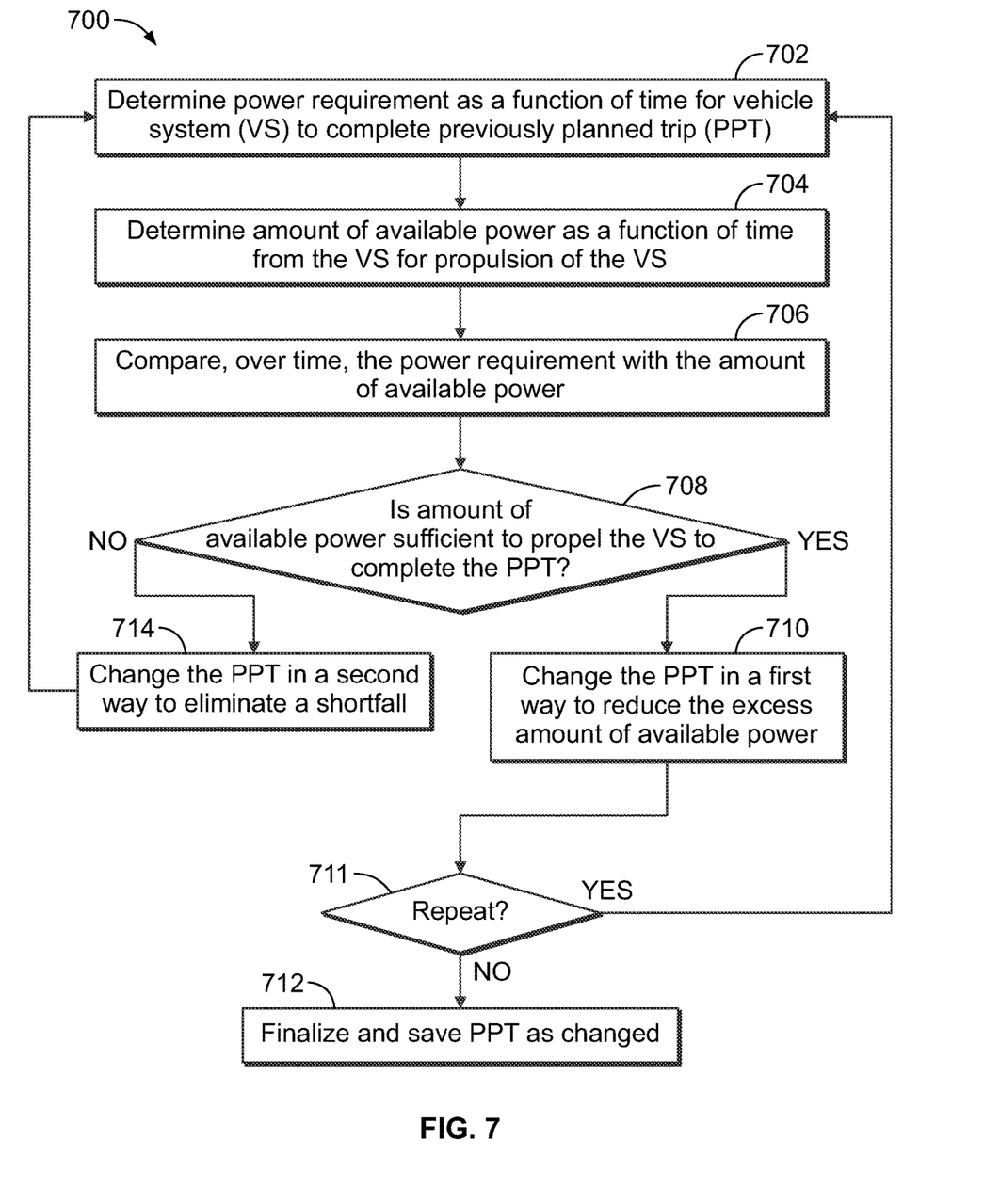
FIG. 7 is a flow chart of a method for changing a planned trip of a vehicle system and controlling movement of the vehicle system on the planned trip according to an embodiment.

FIG. 7 is a flow chart 700 of a method for changing a planned trip of a vehicle system and controlling movement of the vehicle system on the planned trip according to an embodiment. Various steps of the method may be performed by the one or more processors 112 of the controller 110 shown in FIG. 1 and described above with reference to FIGS. 1 through 6. For example, various steps may be performed by the one or more processors of the controller to change the planned trip to increase or achieve certain objectives during the trip, such as increase energy efficiency, while abiding by designated constraints. The method may include additional steps than shown in FIG. 7, fewer steps than shown in FIG. 7, and/or different steps than the steps shown in FIG. 7.

At step 702, a power requirement for a vehicle system to complete a previously planned trip is determined as a function of time. At step 704, an amount of available power from the vehicle system is determined as a function of time. At step 706, the amount of available power is compared, over time, with the power requirement that is determined. At step 708, a determination is made whether the amount of available power is sufficient to propel the vehicle system to complete the previously planned trip, based on the comparison.

If the amount of available power is sufficient, then flow proceeds to step 710. At step 710 the previously planned trip is changed in a first way. For example, the previously planned trip may be changed to reduce the excess amount of available power by reducing the number of fuel-consuming vehicles in the consist. After step 710, it is determined at step 711 whether to repeat the method or not. If not, the planned trip as modified at step 710 is saved and finalized at step 712. If the repeat is decided, the planned trip as modified at step 710 may return to step 702, and the method may repeat in an effort to narrow or focus in on a beneficial solution or permutation of the planned trip.

Returning to step 708, if the amount of available power is insufficient, such that there is an expected shortfall during the trip, then flow proceeds to step 714. At step 714 the previously planned trip is changed in a second way that is different from the first way in step 710. For example, the previously planned trip may be changed to eliminate the shortfall by changing the vehicular makeup or the operational aspects of the trip (e.g., trip characteristics) to increase the amount of available power as a function of time relative to the power requirement as a function of time. Then, the flow returns to step 702 and the method repeats in an effort to narrow or focus in on a beneficial solution or permutation of the planned trip.

Although not shown in FIG. 7, after the planned trip is finalized, the vehicle system may be controlled to perform the planned trip according to the finalized plan. Further, the controller may preferentially balance between types of energy storage. That is, the controller may select to have as a reserve of energy at the end of a trip more fuel rather than stored electrical charge (e.g., battery, ultracapacitors), or vice versa. And, during the trip, the controller may selectively use one energy type preferentially in one location. This may happen as a battery is preferentially discharged to propel the vehicle system through a tunnel, or the engine is preferentially run in hot ambient to keep the batteries from getting too hot. The controller may make these selections both with a goal of completing the trip, but within that general constraint also to protect component health, component life, reduce emissions, reduce noise (e.g., in a residential neighborhood), and/or improve performance of the vehicle system.

In at least one embodiment, a method is provided that includes determining a power requirement for a vehicle system to complete a planned trip over a route. The method includes determining whether an amount of available power from the vehicle system is sufficient to propel the vehicle system to complete the planned trip by comparing the available power with the power requirement that is determined. The method also includes changing one or more operational aspects of the planned trip based on the comparison between the amount of available power and the power requirement that is determined to generate a newly planned modified trip.

Optionally, changing the planned trip occurs while the vehicle system is traversing the route during the planned trip. Optionally, determining the amount of available power includes reserving a designated amount of available energy onboard the vehicle system for use by the vehicle system after completion of the planned trip. The amount of available power as that is determined may exclude the designated amount of available energy that is reserved. Optionally, the planned trip is a first planned trip of a plurality of planned trips, and the designated amount of available energy that is reserved is used by the vehicle system to propel the vehicle system along a second planned trip that is subsequent to the first planned trip, propel the vehicle system in a yard, and/or power non-propulsion loads onboard the vehicle system. Optionally, the amount of available power is determined based at least in part on an amount of regenerative energy that the vehicle system is estimated to be captured during braking events during the planned trip.

Optionally, the amount of available power is determined based at least in part on a determination of a state of charge, a state of health, and/or a charge capacity of one or more electrical energy storage devices onboard the vehicle system. Optionally, the amount of available power is determined based at least in part on a number of fuel cells onboard the vehicle system and/or an amount of fuel for the fuel cells that is onboard the vehicle system. Optionally, the amount of available power as the function of time is determined based at least in part on an amount of fuel onboard the vehicle system to power an engine of the vehicle system and/or a power rating of the engine. Optionally, changing the planned trip includes delaying a scheduled arrival time of the vehicle system on the planned trip and/or extending a designated period of time at which to complete the planned trip. Optionally, changing the planned trip includes adding a waypoint to the planned trip to perform one or both of refueling or recharging of the vehicle system. Optionally, changing the planned trip includes changing from a first planned route that is to be traveled on by the vehicle system to complete the planned trip to a second different route.

Optionally, changing the planned trip includes controlling the vehicle system to exceed an emissions constraint of the engines. Optionally, determining the power requirement is as a function of time or a function of distance. Optionally, the power requirement is determined based on a grade of one or more routes of the planned trip, a current or wind direction and speed, a distance to complete the planned trip, a category of one or more vehicles in the vehicle system, an ambient environment in which the vehicle system is planned to travel during the planned trip, a weight of the vehicle system, a speed profile that is planned to be followed by the vehicle system during the planned trip, and/or a load that is planned to be carried by the vehicle system during the planned trip.

Optionally, the power requirement is determined as a function of time and is based at least in part on the vehicle system completing the planned trip at a scheduled arrival time or within a designated period of time. Optionally, the power requirement that is determined is a first power requirement, and the method further includes changing the scheduled arrival time and/or the designated period of time, and determining a modified power requirement as a function of time for the vehicle system to complete the planned trip based on the one or more of the scheduled arrival time that is changed or the designated period of time that is changed. The modified power requirement is different from the first power requirement. The method also includes determining whether the amount of available power as the function of time from the vehicle system is sufficient to propel the vehicle system to complete the planned trip by comparing the amount of available power to the modified power requirement that is determined, and changing the planned trip to create a newly planned modified trip based at least in part on the comparison between the amount of available power and the modified power requirement that is determined.

Optionally, the power requirement is a first power requirement and the amount of available power is a first amount of available power. The method further includes determining, during movement of the vehicle system on a newly planned modified trip, a second power requirement for the vehicle system to complete a segment of the newly planned modified trip. The method also includes determining that a second amount of available power from the vehicle system is insufficient to propel the vehicle system to complete the segment of the newly planned modified trip according to the second power requirement, and changing the segment of the newly planned modified trip based at least in part on the second amount of available power being insufficient to propel the vehicle system to complete the segment of the newly planned modified trip according to the second power requirement.

Optionally, changing the segment of the newly planned modified trip includes changing a scheduled time of arrival of the vehicle system at an end location of the segment. Optionally, the planned trip is changed by calculating different amounts of calculated power that are needed to complete the planned trip along different first and second sets of routes and then changing the planned trip to include the second set of routes. The first set of routes defines a shorter distance to complete the planned trip than the second set of routes but a larger uphill grade and/or a shorter radius of curvature than the second set of routes.

In one or more embodiments, a controller is provided that includes one or more processors. The one or more processors may determine a power requirement for a vehicle system to complete a planned trip, and determine whether an amount of available power from the vehicle system is sufficient to propel the vehicle system to complete the planned trip by comparing over time the amount of available power with the power requirement that is determined. The one or more processors may change the planned trip based at least in part on the comparison between the amount of available power and the power requirement that is determined.

Optionally, the one or more processors may determine the amount of available power based at least in part on an amount of regenerative energy that the vehicle system is estimated to capture during braking on the planned trip or to receive from a catenary line or third rail. Optionally, the one or more processors may determine the amount of available power based at least in part on a state of charge, a state of health, and/or a charge capacity of one or more electrical energy storage devices onboard the vehicle system. Optionally, the one or more processors may change the planned trip by adding a stop to one or more of refuel or recharge the vehicle system. Optionally, the one or more processors may determine the power requirement based at least in part on a grade of one or more routes of the planned trip, a distance to complete the planned trip, a category of one or more vehicles in the vehicle system, an ambient environment in which the vehicle system is planned to travel during the planned trip, a weight of the vehicle system, a speed profile that is planned to be followed by the vehicle system during the planned trip, and/or a load that is planned to be carried by the vehicle system during the planned trip.

In one or more embodiments, a system is provided that includes one or more processors that may determine a power requirement for a vehicle system to complete a planned trip. The one or more processors may determine whether an amount of available power from the vehicle system is sufficient to propel the vehicle system to complete the planned trip by comparing over time the amount of available power with the power requirement that is determined. The one or more processors may change the planned trip based at least in part on the comparison between the amount of available power and the power requirement that is determined.

Optionally, the one or more processors may reserve a designated amount of available energy onboard the vehicle system for use by the vehicle system after completion of the planned trip when determining the amount of available power as the function of time. The one or more processors may determine the amount of available power to exclude the designated amount of available energy that is reserved. Optionally, the one or more processors may determine the amount of available power as the function of time based at least in part on an amount of regenerative energy that the vehicle system is estimated to capture during braking on the planned trip or to receive from a catenary line or third rail. Optionally, the one or more processors may determine the amount of available power based at least in part on a state of charge, a state of health, and/or a charge capacity of one or more electrical energy storage devices onboard the vehicle system.

Optionally, the one or more processors may change the planned trip by adding a stop to refuel and/or recharge the vehicle system. Optionally, the one or more processors may change the planned trip by switching from a first route to a different second route that is traveled on to complete the planned trip. Optionally, the one or more processors may determine the amount of available power as the function of time based on a number of fuel cells onboard the vehicle system and/or an amount of fuel for the fuel cells that is onboard the vehicle system. Optionally, the one or more processors may determine the amount of available power as the function of time based on an amount of fuel onboard the vehicle system to power an engine of the vehicle system and/or a power rating of the engine. Optionally, the one or more processors may determine the power requirement based at least in part on a grade of one or more routes of the planned trip, a distance to complete the planned trip, a category of one or more vehicles in the vehicle system, an ambient environment in which the vehicle system is planned to travel during the planned trip, a weight of the vehicle system, a speed profile that is planned to be followed by the vehicle system during the planned trip, and/or a load that is planned to be carried by the vehicle system during the planned trip.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term may include tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:
    determining a power requirement for a vehicle system to complete a planned trip, the vehicle system including multiple power sources configured to power propulsion of the vehicle system along one or more routes of the planned trip, the power requirement representing a set of instantaneous power outputs of the vehicle system as a function of a set of times, a set of distances, or a set of locations during the planned trip;
    determining an amount of available power from the multiple power sources of the vehicle system, the amount of available power representing a set of instantaneous power inputs as the function of the set of times, the set of distances, or the set of locations during the planned trip, wherein each instantaneous power input of the set corresponds to a cumulative power available from the multiple power sources for powering propulsion;
    determining a shortfall representing a portion of the set of times, the set of distances, or the set of locations in which the amount of available power is less than the power requirement; and
    eliminating the shortfall by modifying the planned trip, wherein modifying the planned trip comprises one or more of changing a vehicular makeup of the vehicle system or changing one or more operational aspects of the planned trip.

2. The method of claim 1, wherein modifying the planned trip occurs while the vehicle system is traversing the one or more routes during the planned trip.

3. The method of claim 1, wherein determining the amount of available power includes reserving a designated amount of available energy onboard the vehicle system for use by the vehicle system after completion of the planned trip, such that the amount of available power that is determined excludes the designated amount of available energy that is reserved.

4. The method of claim 3, wherein the planned trip is a first planned trip of a plurality of planned trips, and the designated amount of available energy that is reserved is used by the vehicle system to one or more of propel the vehicle system along a second planned trip that is subsequent to the first planned trip, propel the vehicle system in a yard, or power non-propulsion loads onboard the vehicle system.

5. The method of claim 1, wherein determining the amount of available power includes estimating an amount of regenerative energy to be captured by the vehicle system during braking events during the planned trip.

6. The method of claim 1, wherein the amount of available power is determined based at least in part on a determination of one or more of a state of charge, a state of health, or a charge capacity of one or more electrical energy storage devices onboard the vehicle system.

7. The method of claim 1, wherein the amount of available power is determined based at least in part on one or more of a number of fuel cells onboard the vehicle system and an amount of fuel for the fuel cells that is onboard the vehicle system.

8. The method of claim 1, wherein the amount of available power is determined based at least in part on one or more of an amount of fuel onboard the vehicle system to power an engine of the vehicle system and a power rating of the engine.

9. The method of claim 1, wherein changing the one or more operational aspects of the planned trip includes one or more of delaying a scheduled arrival time of the vehicle system or extending a designated period of time at which to complete the planned trip.

10. The method of claim 1, wherein the changing the one or more operational aspects of the planned trip includes adding a scheduled stop to the planned trip to perform one or both of refueling or recharging of the vehicle system.

11. The method of claim 1, wherein the changing the one or more operational aspects of the planned trip includes changing at least one of the one or more routes to be traveled by the vehicle system to complete the planned trip.

12. The method of claim 1, wherein the power requirement is determined based on one or more of a grade of the one or more routes of the planned trip, a current or wind direction and speed, a distance to complete the planned trip, a category of one or more vehicles in the vehicle system, an ambient environment in which the vehicle system is planned to travel during the planned trip, a weight of the vehicle system, a speed profile to be followed by the vehicle system during the planned trip, or a load to be carried by the vehicle system during the planned trip.

13. The method of claim 1, wherein the power requirement is determined based at least in part on the vehicle system completing the planned trip at a scheduled arrival time or within a designated period of time after starting the planned trip.

14. The method of claim 1, wherein modifying the planned trip includes changing the vehicular makeup of the vehicle system to increase a charge capacity of one or more energy storage devices onboard the vehicle system.

15. The method of claim 1, further comprising automatically controlling the vehicle system to travel along the one or more routes according to the planned trip as modified.

16. The method of claim 1, wherein the multiple power sources of the vehicle system include at least one fuel-consuming engine and at least one energy storage device.

17. A system comprising:
one or more processors configured to:
determine a power requirement for a vehicle system to complete a planned trip, the vehicle system including multiple power sources configured to power propulsion of the vehicle system along one or more routes of the planned trip, the power requirement representing a set of instantaneous power outputs of the vehicle system as a function of a set of times, a set of distances, or a set of locations during the planned trip,
determine an amount of available power from the multiple power sources of the vehicle system, the amount of available power representing a set of instantaneous power inputs as the function of the set of times, the set of distances, or the set of locations during the planned trip, wherein each instantaneous power input of the set corresponds to a cumulative power available from the multiple power sources for powering propulsion,
determine a shortfall that represents a portion of the set of times, the set of distances, or the set of locations in which the amount of available power is less than the power requirement, and
modify the planned trip by one or more of changing a vehicular makeup of the vehicle system or changing one or more operational aspects of the planned trip.

18. The system of claim 17, wherein the one or more processors are configured to determine the amount of available power based at least in part on estimating one or both of (i) an amount of regenerative energy to be captured by the vehicle system during braking on the planned trip or (ii) an amount of electrical energy to be received by the vehicle system from a catenary line or third rail on the planned trip.

19. The system of claim 17, wherein the one or more processors are further configured to determine the amount of available power based at least in part on one or more of a state of charge, a state of health, or a charge capacity of one or more electrical energy storage devices onboard the vehicle system.

20. The system of claim 17, wherein the one or more processors are configured to change the one or more operational aspects of the planned trip by adding a scheduled stop to one or more of refuel or recharge the vehicle system.

21. The system of claim 17, wherein the one or more processors are configured to determine the power requirement based at least in part on one or more of a grade of the one or more routes of the planned trip, a distance to complete the planned trip, a category of one or more vehicles in the vehicle system, an ambient environment in which the vehicle system is planned to travel during the planned trip, a weight of the vehicle system, a speed profile to be followed by the vehicle system during the planned trip, or a load to be carried by the vehicle system during the planned trip.

22. A method comprising:
determining a power requirement for a vehicle system to complete a planned trip, the vehicle system including multiple power sources configured to power propulsion of the vehicle system along one or more routes of the planned trip, the power requirement representing a set of instantaneous power outputs of the vehicle system as a function of a set of times, a set of distances, or a set of locations during the planned trip;
determining an amount of available power from the multiple power sources of the vehicle system, the amount of available power representing a set of instantaneous power inputs as the function of the set of times, the set of distances, or the set of locations during the planned trip, wherein each instantaneous power input of the set corresponds to a cumulative power available from the multiple power sources for powering propulsion;

determining a shortfall representing a portion of the set of times, the set of distances, or the set of locations in which the amount of available power is less than the power requirement; and remedying the shortfall by modifying the planned trip, wherein modifying the planned trip comprises one or both of replacing a fuel-consuming vehicle of the vehicle system with a first battery-powered vehicle or changing one or more operational aspects of a second battery-powered vehicle in the vehicle system.

* * * * *